(12) United States Patent
Phillippe et al.

(10) Patent No.: US 12,353,420 B2
(45) Date of Patent: Jul. 8, 2025

(54) TECHNIQUES FOR PROVIDING SYNCHRONOUS AND ASYNCHRONOUS DATA PROCESSING

(71) Applicant: Oracle International Corporation, Redwood Shores, CA (US)

(72) Inventors: Bryan James Phillippe, Fall City, WA (US); Ashok Nagarajan, Hillsboro, OR (US); Jeonghyeon Hwang, Elmhurst, NY (US); John James Backof, II, Tiburon, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1002 days.

(21) Appl. No.: 17/387,795

(22) Filed: Jul. 28, 2021

(65) Prior Publication Data
US 2023/0034196 A1    Feb. 2, 2023

(51) Int. Cl.
| | |
|---|---|
| *G06F 16/24* | (2019.01) |
| *G06F 9/455* | (2018.01) |
| *G06F 9/54* | (2006.01) |
| *G06F 16/2455* | (2019.01) |
| *G06N 5/04* | (2023.01) |
| *G06N 20/00* | (2019.01) |

(52) U.S. Cl.
CPC .... *G06F 16/24568* (2019.01); *G06F 9/45558* (2013.01); *G06F 9/544* (2013.01); *G06F 9/546* (2013.01); *G06N 5/04* (2013.01); *G06N 20/00* (2019.01); *G06F 2009/45595* (2013.01); *G06F 2209/547* (2013.01)

(58) Field of Classification Search
None
See application file for complete search history.

(56) References Cited

U.S. PATENT DOCUMENTS

| | | | |
|---|---|---|---|
| 10,360,494 B2 * | 7/2019 | Wang | G06F 18/24143 |
| 11,057,318 B1 * | 7/2021 | Matthews | H04L 49/30 |
| 2022/0198318 A1 * | 6/2022 | Kalari | G06F 9/38 |

* cited by examiner

*Primary Examiner* — Craig C Dorais
(74) *Attorney, Agent, or Firm* — Kilpatrick Townsend & Stockton LLP

(57) ABSTRACT

Techniques discussed herein include dynamically providing synchronous and/or asynchronous data processing by a machine-learning model service. The machine-learning model service ("the service") executes a stream manager application, a web interface, and a machine-learning model via a common container. The stream manager application can obtain input data (e.g., from an input data stream, a partition of an input data stream, etc.) and provide the data to the machine-learning model through the web interface using a local communication channel (e.g., a loopback interface that bypasses local network interface hardware of the computing device on which the model executes). Prediction results from the model may be provided as output data (e.g., to an output data stream, to a partition of an output data stream, etc.).

20 Claims, 10 Drawing Sheets

TECHNIQUES FOR PROVIDING SYNCHRONOUS AND ASYNCHRONOUS DATA PROCESSING

BACKGROUND

Cloud-based services have become increasingly common. Some machine-learning models are provided via the Internet where an input can be provided in a request to the model and an output returned. Conventionally, these requests are synchronously processed. That is, the model sequentially processes the request and the response before moving to another request. This is not ideal for tasks that include a high number of requests. Conventional techniques also utilize a processing service to receive the input. The processing service then copies the input over to an input channel of the model. Similarly, the model's output is provided to the processing service that then transmits the result to the requestor. This technique results in latency issues due to the copying required.

BRIEF SUMMARY

Techniques are provided (e.g., a method, a system, non-transitory computer-readable medium storing code or instructions executable by one or more processors) for asynchronous input streaming. Various embodiments are described herein, including methods, systems, non-transitory computer-readable storage media storing programs, code, or instructions executable by one or more processors, and the like.

One embodiment is directed to a method for providing asynchronous data processing. The method may include obtaining, by a stream manager application of a machine-learning model service within a cloud-computing environment, input data corresponding to a request for output. In some embodiments, the machine-learning model service executes a stream manager application and a machine-learning model via a common cloud-computing container. The machine-learning model service may be configured to selectively process instances of input data using a synchronous process or an asynchronous process. The method may further include providing, by the stream manager application via a local communication channel, the input data as input to the machine-learning model. In some embodiments, the local communication channel bypasses a local network interface hardware of a computing device on which the machine-learning model service executes. The method may further include receiving, by the stream manager application via the local communication channel, prediction results from the machine-learning model. The method may further include providing the prediction results as output data in response to the request.

Another embodiment is directed to a computing device that executes a machine-learning service, the computing device comprising one or more processors and one or more non-transitory computer-readable instructions that, when executed by the one or more processors, cause the machine-learning service to perform the disclosed methods.

Yet another embodiment is directed to a non-transitory computer-readable storage medium storing computer-executable instructions that, when executed by one or more processors of a computing device executing a machine-learning model service within a cloud-computing environment, cause the computing device to perform the disclosed methods.

The foregoing, together with other features and embodiments will become more apparent upon referring to the following specification, claims, and accompanying drawings.

BRIEF DESCRIPTION OF THE DRAWINGS

Various embodiments in accordance with the present disclosure will be described with reference to the drawings, in which.

DETAILED DESCRIPTION

Figure 1:
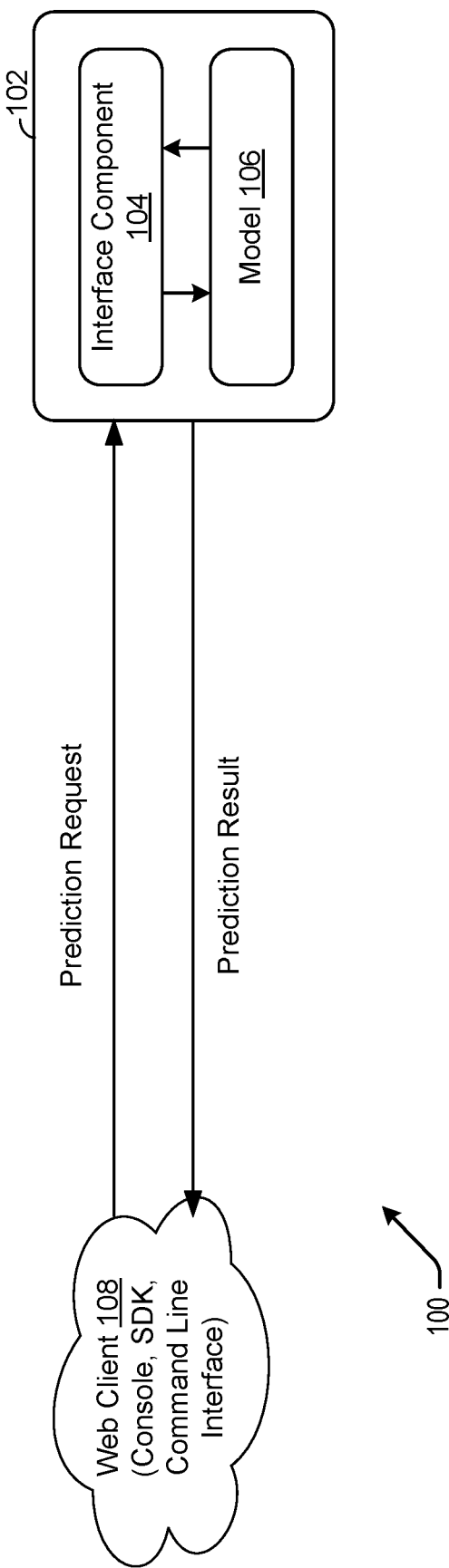
FIG. 1 depicts an example conventional system in which data processing is provided synchronously.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure relates to techniques for providing a machine-learning model service that is configured to selectively provide synchronous or asynchronous data processing of a machine-learning model. A "synchronous" process refers to one in which a request and response are configured to be processed sequentially and before another request/response can be processed. In some instances, the processing must be performed sequentially. An "asynchronous" process refers to one in which a request and response may be processed in order, but potentially while one or more other operations were performed between processing the two. As used herein, a "machine-learning model" refers to any suitable inferred function that has been configured (e.g., trained) using any suitable machine-learning algorithm. These machine-learning algorithms may utilize any suitable algorithm such as supervised learning algorithms, unsupervised learning algorithms, semi-supervised learning algorithms, and/or reinforced learning algorithms. The particular domain in which the model applies depends on the context in which it is used. By way of example, the model may be trained for anomaly detection, facial recognition, targeted marketing, and the like. During an inference phase (e.g., after the model has been trained), the model may be used to receive and process input with the inferred function to produce an output (e.g., a resulting prediction).

Conventional systems that provide such models typically do so by providing an intervening service to receive the input. The intervening service then copies the input data to an input channel to the model. The model generates output which the intervening service copies from the output channel of the model and provides the data to the original requester. Utilizing an intervening service has been beneficial in some aspects as it is a standalone process separate from the model and does not have to be changed and redeployed if some aspect of the model is modified. However, utilising an intervening service incurs latency due to the copies required from requestor to model and vice versa. Additionally, conventional systems may require synchronous processing. That is, the machine-learning model may not process additional input unless output has been generated for the input already received and the requestor may be forced to wait for the output from the model before proceeding to other processing.

By contrast, the techniques herein allow for synchronous and asynchronous processing to occur. The machine-learning service may execute an interface component (e.g., a web server) and a stream manager application. The interface component may be configured to process request via a web interface. The interface component and the stream manager application may be provided in a same cloud-computing container (e.g., a virtual machine instance) as a machine-learning model. The stream manager application can consume (e.g., receive, obtain, etc.) a request comprising input data (e.g., via a data stream or a partition of a data stream), and provide the input data (e.g., through the web interface) via a local channel (e.g., a loopback network interface) that bypasses the network interface hardware of the computing device on which the model executes. For examples, a loopback network interface (also referred to as "a virtual network interface") may operate as part of the computing device's operating system's networking software and provide the ability for network application executing on the same machine to communicate with one another. When using a loopback network interface, no packets are provided to any physical network interface controller device. Any traffic that is sent to the loopback address (e.g., an IP address) is immediately passed to the network software stack as if it had been received from another device.

In some embodiments, a request can be sent via the web interface from a web client. Such a request may be processed using a synchronous process in which the input data (e.g., provided in the request) can be provided to the model and prediction results generated by the model using the input data may be provided back to the requesting device (e.g., a web client).

In some embodiments, a request can be sent via the web interface from a web client and received by an interface component of the machine-learning model service (e.g., a component configured to execute as a web server). Content of the request can be used to determine whether to process the request via a synchronous or asynchronous process. By way of example, if an input data stream and/or an output data stream is provided in the request, operations can be executed to configure the stream manager to consume input data from the specified input data stream and provide output to the specified output data stream. The stream manager may then process input data using an asynchronous process in which input data may be obtained from the specified input data stream by the stream manager, provided to the model (e.g., via the web interface), and prediction results generated by the model can be written to the specified output data stream. Alternatively, if the content of the request does not include an input data stream and/or output data stream, the request can be processed using a synchronous process in which the interface component provides input data obtained from the request to the machine-learning model, obtains the prediction results generated by the model, and provides those results as output back to the requesting device.

The techniques discussed herein provide for the ability to provide any suitable combination of synchronous and asynchronous processing while simultaneously reducing the latency experienced in conventional systems. By co-locating the intervening service on the same device/cloud-computing instance as the one that executes the machine-learning model, the intervening service no longer is required to transmit the input data via the network to the model. This reduces the overall number of messages being transmitted via the network (e.g., by half or more), which in turn reduces the latency between request and response as well as conserving the processing resources of the machine executing the model.

Moving on to FIG. 1, in which an example conventional system 100 for providing synchronous data processing is depicted. Past techniques involve model deployments that provide machine-learning model inference functionality (an example of data processing) in a synchronous manner. By way of example, conventional techniques provide machine-learning model functionality via machine-learning model service 102 that includes a number of subcomponents. These subcomponents include an interface component (e.g., interface component 104 such as an application programming interface, a REST API, or the like) and the model itself (e.g., model 106 that provides the machine-learning model functionality). The interface component 104 may be configured to serve as an interface for the model 106 with which input data may be submitted.

Web client 108 can invoke the functionality of the model 106 (e.g., using a console interface, software development kit interface, command line interface, etc.) based on providing input data via a prediction request to the model 106 which processes the request and provides a prediction result to the web client 108. The request and result and result are processed synchronously. That is, the web client 108 is configured to wait for the model 106 to provide output via the interface component 104 before it can proceed. In some examples, the web client 108 must wait for the model 106.

Figure 2:
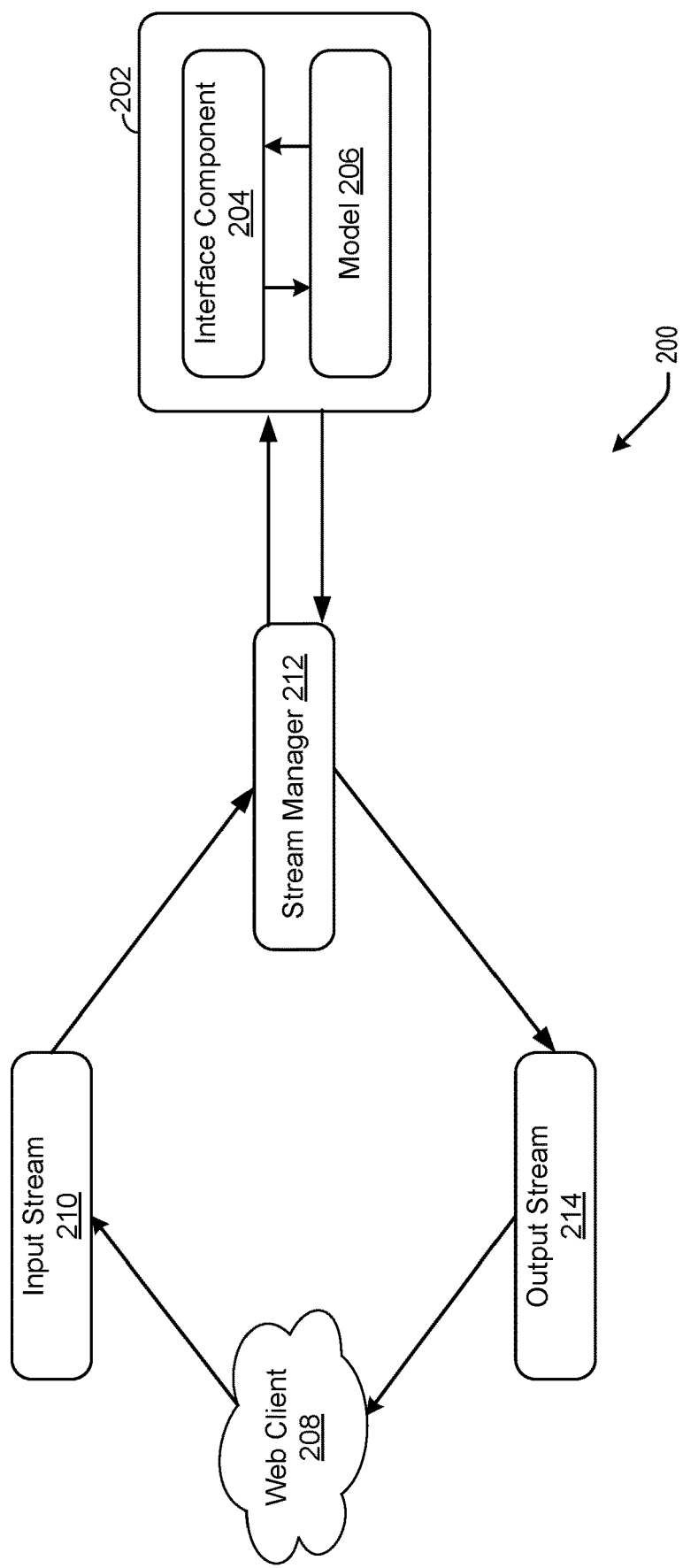
FIG. 2 depicts an example conventional system in which data processing is provided synchronously utilizing multiple data streams.

FIG. 2 depicts an example conventional system 200 in which data processing is provided synchronously utilising multiple data streams. FIG. 2 similarly provides deployment 202 (an example of the machine-learning model service 102 of FIG. 1). Machine-learning model service 202 includes interface component 204 and model 206 (examples of interface component 104 and model 106 of FIG. 1).

In the example of FIG. 2, web client 208 (an example of the web client 108 of FIG. 1) may utilize input stream 110 to provide input data. Input stream 110 may be an example of a cloud-computing streaming service stream (e.g., an Oracle Streaming Service Stream).

Stream manager 112 may be a cloud-computing streaming service (e.g., OCI streaming service) configured to provide and manage scalable and durable high-volume data streams in real-time.

In conventional systems, the input stream is received by the stream manager 212. The stream manager 212 may then copy the input data to send the input to the model 206 via interface component 204. The model 206 may then process the input data to produce a result which it then sends via the interface component 204 to the stream manager 212. The stream manager 212 may copy the output data and transmit it through the output stream 214 back to client 208. Because the instances of stream manager 212 are operating as separate services in separate containers (e.g., virtual machines different from those executing the model 216), the stream manager 212 may need to act as an arbiter, retrieving input data from the input stream to provide to the model 206 via the interface component 204 and providing the output obtained from the model 206 to the output stream 214. The use of the stream manager 212 in this context incurs a degree of latency because of the copies it may need to perform between the input stream 210 and the interface component 204 well as between the interface component 204 and the output stream 214. Additionally, the network in which the stream manager 212 operates may become congested due at least in part to the messages transmitted between the stream manager 212 and the interface component 204.

Figure 3:
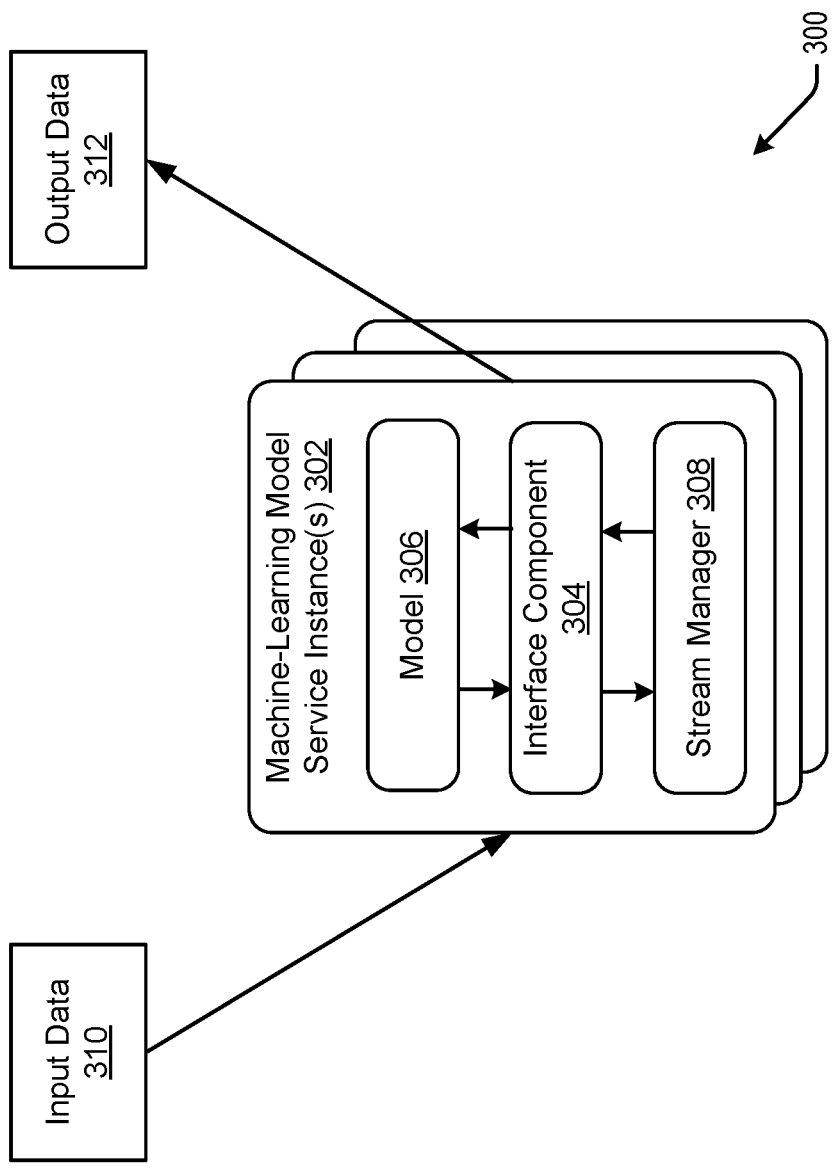
FIG. 3 illustrates an example environment for providing synchronous data processing by a machine-learning model service, in accordance with at least one embodiment.

FIG. 3 illustrates an example environment for providing synchronous data processing by a machine-learning model service (e.g., machine-learning model service instance(s) 302), in accordance with at least one embodiment.

In the environment 300, the machine-learning model service instance(s) 302 may individually provide machine-learning model inference functionality (an example of data processing) in a synchronous manner. By way of example, machine-learning model service instance(s) 302 may individually include a number of subcomponents such as interface component 304 (e.g., a component that acts as a web server that processes requests from an application programming interface, REST API, etc.), model 306 (e.g., a machine-learning model that has previous been trained using any suitable machine-learning algorithms to generate an inferred function that takes input data as input and generates an inference (prediction results) as output), and stream manager 308 (e.g., software service or application configured to provide stream processing of one or more data streams (e.g., one or more Oracle Streaming Service Streams). In some embodiments, the stream manager 308 may be configured to provide substantially similar processing as the stream manager 212 of FIG. 2).

In some embodiments, the interface component 304, the model 306, and the stream manager 308 execute on the same device and/or cloud-computing container (e.g., a virtual machine instance). The interface component 304 and the stream manager 308 may be communicatively coupled (able to communicate with one another) via a local communication channel (e.g., a loopback interface (sometimes referred to as a loopback network interface), an inter-process communication interface, direct memory copies, direct process-to-process communication, or any suitable local exchange of data between two processes executing on a common computing device). By way of example, the interface component 304 may communicate with the stream manager 308 via a loopback network interface that is part of the network layer of the operating system of the computing device on which the machine-learning model service (one of the instances of machine-learning model service instance(s) 302) executes.

In some embodiments, any suitable number of machine-learning model service instances may be deployed, each including a corresponding interface component 304, model 306, and stream manager 308. In some embodiments, the stream manager 308 may be added to a virtual machine image that previously include interface component 304 and model 306 in order to provide an image for each of the machine-learning model service instance(s) 302.

While the interface component 304 (an example of the interface components 104 and 204 of FIG. 2) may have once provided web server functionality that enabled the model to be accessible via a public network such as the Internet, the interface component 304 may be configured to be accessible to the stream manager 308 (e.g., additionally or exclusively). Utilizing these techniques, the functionality of the stream manager 308 and the model 306 may be provided as a single service where the functionality of the model 306 may be made public or private. For example, the machine-learning model service instance(s) 302 may be configured to allow web requests to be received from a web client by the interface component 304 and/or the machine-learning model service instance(s) 302 can individually by configured to allow requests from the stream manager 308. In this manner, the machine-learning model service instance(s) 302 can individually be configured to provide synchronous and/or asynchronous processing.

FIG. 3 illustrates an example in which a request is processed using synchronous processing. Input data 310 may be received (e.g., from the web client 108 of FIG. 1) by the interface component 304. The interface component 304 may forward the input data 310 to the model 306. The model 306 may process the input data to generate output data. The output data may then be provided by the model to the interface component 304 which may then forward the output data, unmodified, through the loopback interface to the stream manager 308 that, in turn, provides the output data to the web client.

In some embodiments, the interface component 304 may determine whether to process the request via a synchronous or asynchronous process based at least in part on the content of a received request. By way of example, if a request received by the interface component 304 from the web client 108 specifies an input data stream and/or output data stream, the interface component 304 may be configured to execute any suitable operations for configuring the stream manager 308 to consume input data from the specified input stream and/or write output data to the specified output stream. By way of example, one or more deployment configuration parameters may be modified (e.g., via a function call executed by the interface component 304) to specify the input and/or output data stream for the stream manager 308. Once configured, the stream manager 308 can then process input data from a corresponding input stream as part of executing an asynchronous processes. Alternatively, if the request does not specify an input and/or output data stream, the interface component 304 may forward the input data directly to the model 306, receive the prediction results from the model 306, and provide those results as output in response to the request.

In some embodiments, a deployment of a machine-learning model service instance may be configured to enable the functionality of the interface component 304 to be invoked only by the stream manager 308. That is, public web requests (e.g., a request from web client 108) may be ignored and only requests from the stream manager 308 may be processed (e.g., asynchronously). Conversely, the interface component 304 may be configured to disallow invocation by the stream manager 308 such that only web requests (e.g., from web clients such as web client 108) may be processed. In this manner, the machine-learning model service instance(s) 302 can be configured to process any suitable combination of requests from web clients and/or requests from the stream manager 308, and ultimately provides any corresponding combination of synchronous and/or asynchronous processing.

Figure 4:
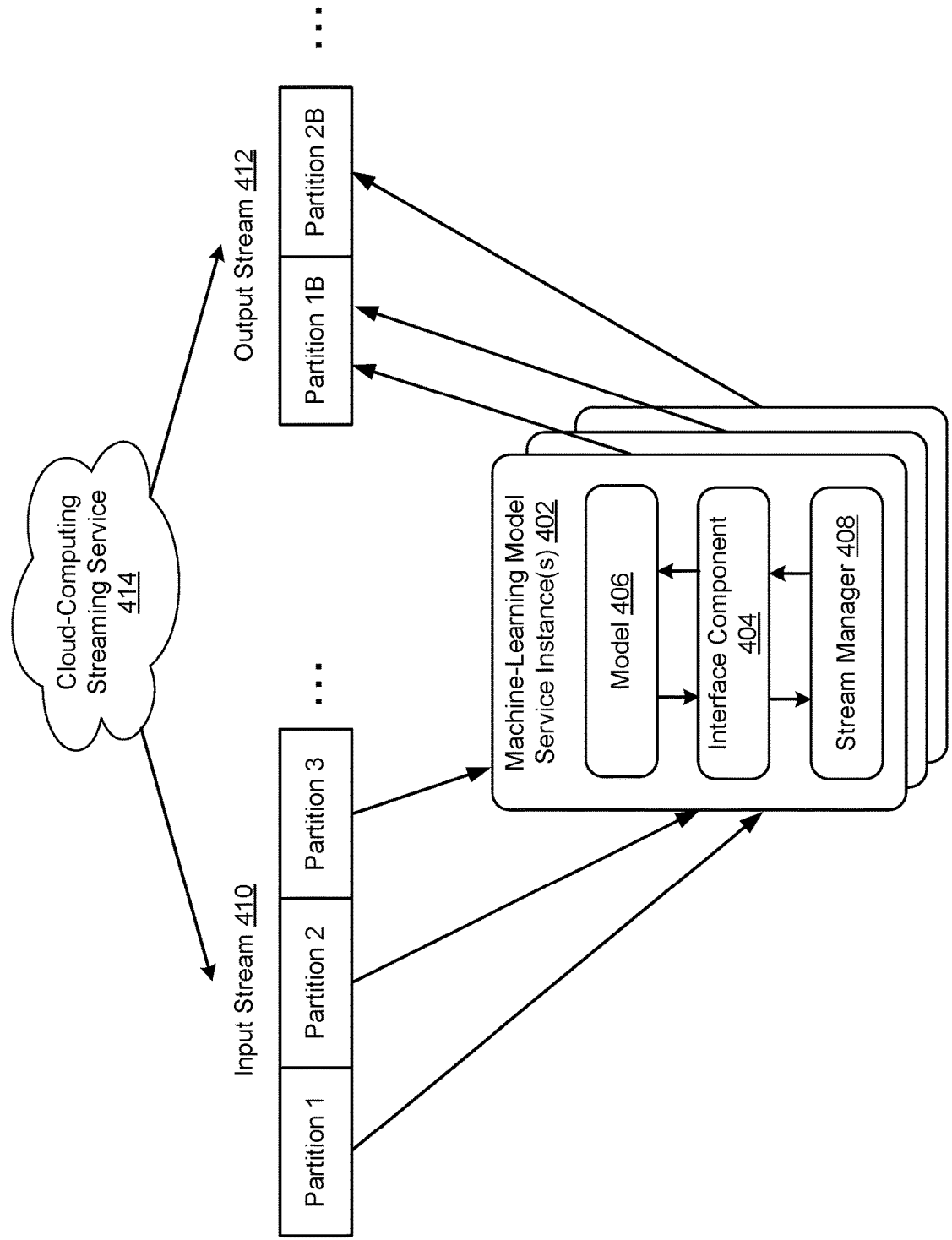
FIG. 4 illustrates an example environment for providing asynchronous data processing utilizing a machine-learning model service and one or more data streams, in accordance with at least one embodiment.

FIG. 4 illustrates an example environment 400 for providing asynchronous data processing by a machine-learning model service (e.g., the machine-learning model service instance(s) 402 each of which are an example of the machine-learning model service instance(s) 302 of FIG. 3) utilising two or more data streams (e.g., an input stream 410 and an output stream 412), in accordance with at least one embodiment. The machine-learning model service instance(s) 402 may individually be examples of the machine-learning model service instance(s) 302 of FIG. 3, each of which may include components 404-408, examples of the interface component 304, model 306, and stream manager 308 of FIG. 3). In some embodiments, the stream manager 408 of each machine-learning model service instance may be preconfigured to process data from input stream 410 (or a partition of input stream 410 such as partition 1) and/or write data to output stream 412 (or a partition of output stream 412 such as partition 1B). In some embodiments, configuring a stream manager to process from a given input and/or output stream (or partition of a stream) may involve setting one or more configuration parameters associated with a given machine-learning model service instance (e.g., an instance corresponding to the stream manager 408). The stream manager may be configured (e.g., the configuration parameters may be set) during a processes for deploying the machine-learning model service instance or based on receiving a request that includes an input stream and/or output stream as described above.

Input stream 410 may be a cloud-computing managed stream (e.g., managed by the cloud-computing streaming service 414, an example of Oracle Streaming Service, etc.). In some cases, one component (e.g., one stream manager) can read from a stream at a time (e.g., only one at a time). Therefore, in some embodiments, the input stream 410 may be partitioned (e.g., by the cloud-computing streaming service 414) a number of stream partitions (e.g., partitions 1-3) may be utilized to enable concurrent processing. The input stream 410 may provide an ordered queue of message (e.g., messages of a fixed length such as 64 bit encoded record or array of bytes) that may each include key/value pairs (e.g., for example a JSON message {"key": "value"}). Producers are refer to entities that create the messages, while "consumers" refer to entities (e.g., stream manager 408) that read messages from the input stream 410. The partitions may each be thought of as a separate stream although they are part of a common input stream. Messages may be stored (e.g., by a cloud-computing streaming service, not depicted) in a partition based at least in part on hashing the message key. Each consumer may be assigned to a specific partition. Each partition can be hosted on a different server (e.g., in different availability domains/datacenters, within a region, etc.), thus, the input stream 410 can be scaled horizontally across multiple servers to provide performance far beyond the ability of a single server.

As a non-limiting example, there may be three instances included in the machine-learning model service instance(s) 402 and three partitions of input stream(s) 410. Each machine-learning model service instance may be assigned to a particular partition. The machine-learning model service instance(s) 402 (specifically, the stream manager 408 of each instance) may be configured to read messages from its assigned partition in the order in which the messages were received. The stream manager 408 may keep track of which messages it has already consumed by keeping track of a message offset (e.g., the location of the message within a stream partition). By storing the offset of the last consumed message, the stream manager 408 can stop reading from the input stream 410, provide the input data read from the stream to the model 406 via the interface component 404, and then return to read from the input stream 410 again.

Input messages may be assigned to particular partitions by a cloud-computing streaming service 414. In some embodiments, the stream manager 408 may be configured to behave as an autonomous client, which polls an associated input stream/partition for any new messages and reads the messages from the stream/partitions. Because the input stream may be partitioned and each machine-learning model service instance can read from a partition (or potentially more than one partition), in this example, three messages can be read at a time and subsequently processed by the machine-learning model service instance(s) 402.

The number of input stream partitions need not match the number of machine-learning model service instance(s) 402. In some embodiments, the number of input stream partitions may be greater than or less than the number of machine-learning model service instance(s) 402. In these cases, the stream manager 408 of each instance may be configured to poll from multiple input partitions (in the instance that the partitions exceed the number of model service instances) or the stream manager 408 may execute a workflow to identify when a given stream manager 408 may read from the stream/partition (e.g., when the number of stream managers exceeds the partitions).

In some embodiments, the stream manager 408 may be configured to write to output stream 412. The output stream 412 may also be managed by the cloud-computing streaming service 414 (e.g., Oracle Streaming Service) and may include any suitable number of partitions (e.g., partitions 1B and 2B). The number of partitions in output stream 412 need not match the number of partitions in Input Stream 410. Each of the machine-learning model service instance(s) 402 may be assigned (e.g., by the cloud-computing streaming service 414) a particular partition of the output stream to which messages are to be written. By way of example, two instances may be assigned to partition 1B and one instance to partition 2B. The cloud-computing streaming service 414 may be configured to read from the partitions 1B and 2B and provide the written output data to the corresponding client.

In some embodiments, the stream manager 408 be enabled or disabled based on the properties of a model deployment. That is when a deployment for the machine-learning model service is created or updated, it may optionally contain a set of stream configuration and behavior attributes which associate a pair of streams (e.g., input stream 410 and output stream 412) with the instance of the model service.

Because the stream manager 408 is included as part of the machine-learning model instance, which may have previously contained only the interface component and the model itself, the number of network message exchanges may be cut in half as the stream manager 308, once a separate component, need no longer transmit network messages to invoke the functionality provided by the model. The loopback interface (or other inter-process communication channel) allows the stream manager to bypass the physical network interface hardware of the computing device on which the particular machine-learning model instance operates. Additionally, while conventional systems used to require an identifier to be included in the request in order to identify which model was to be invoked, the techniques provided herein reduce the data needed and therefore processed in the request since the stream manager 408 is part of the machine-learning model instance and need not determine which model is to be invoked. Stream manager 408 may only invoke the model 306 that is co-located on the same instance on which it runs. As a result of this co-location, the number of compute instances running may be reduced, which in turn reduces the processing overhead of the cloud-computing system (e.g., environment 300) as a whole, and conserves processing resources for other tasks.

As a non-limiting example, a user may train a machine-learning model using any suitable machine-learning algorithms (e.g., supervised, unsupervised, semi-supervised, reinforced, etc.) and any suitable number of training data sets. A supervised machine-learning algorithm refers to a machine learning task that includes learning an inferred function that maps an input to an output based on a labeled training data set for which example input/output pairs are known. Unsupervised machine-learning algorithms refer to a set of algorithms that are used to analyze and cluster unlabeled data sets. These algorithms are configured to identify patterns or data groupings without the need for human intervention. Semi-supervised machine-learning algorithms refer to a set of algorithms that are a mix of supervised and unsupervised machine-learning algorithms. In semi-supervised learning, an algorithms learns from a dataset that includes both labeled and unlabeled data. Reinforced machine-learning algorithms refer to a set of algorithms in which the model receives a delayed reward in the next time step to evaluate its previous action. The concept in reinforced learning is to determine what actions should be taken to maximize the reward for the given circumstances.

By way of example, a facial detection machine-learning model may be trained to identify faces within an input image (e.g., input data) based on inferring a function using a labeled training data set that includes a set of input images and labels indicating whether the corresponding image included a face or not. Once trained, the model may be added to an image of the machine-learning model service and any suitable number of instances of the service may be deployed (e.g., the machine-learning model service instance(s) 402). Each compute instance may run an instance of the machine-learning model service that includes code comprises the model 406 and a web server interface (e.g., interface component 404) that is configured execute the model code each time a request is received.

Figure 5:
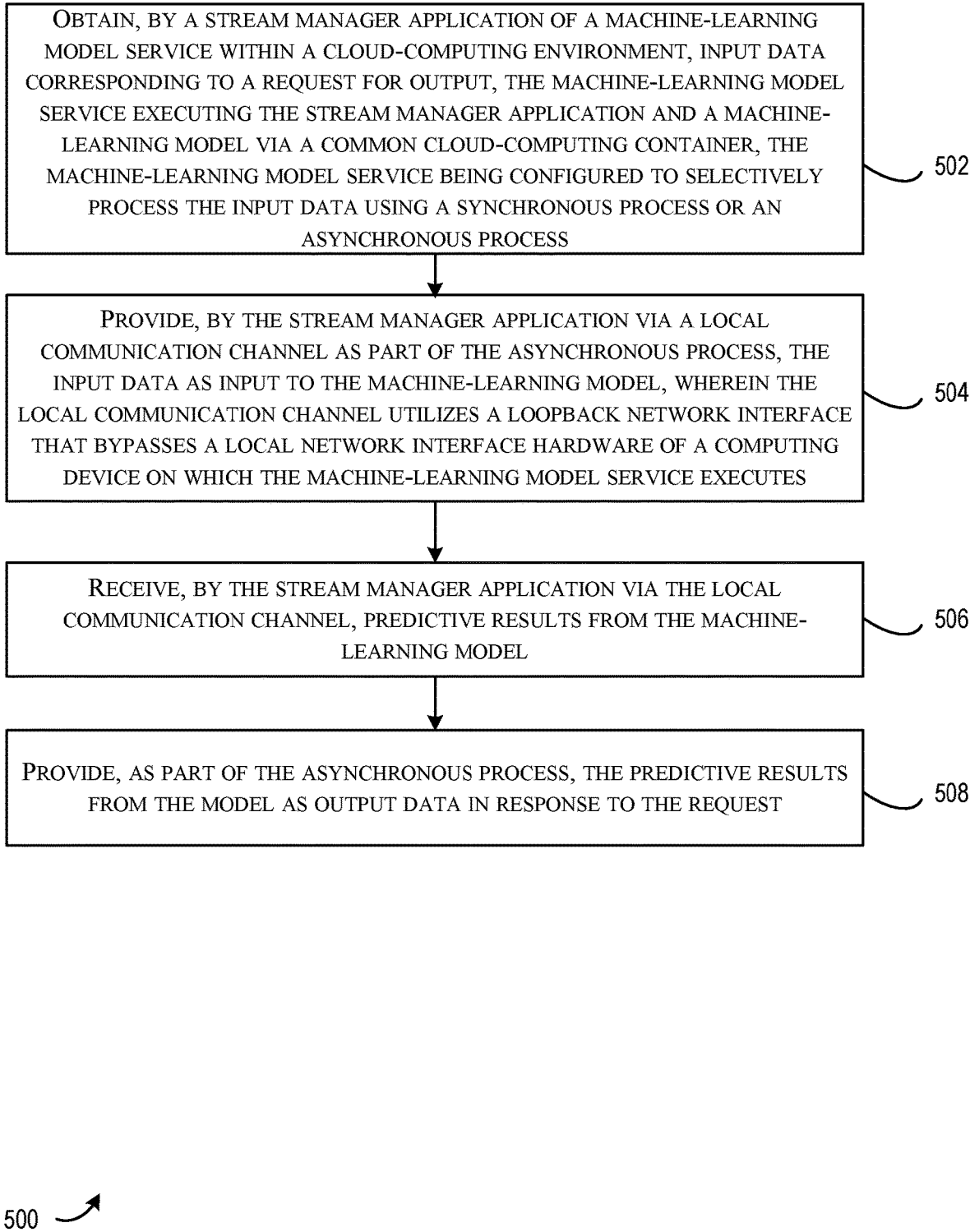
FIG. 5 is a block diagram illustrating an example method for providing synchronous or asynchronous data processing, in accordance with at least one embodiment.

FIG. 5 is a block diagram illustrating an example method 500 for providing asynchronous data processing, in accordance with at least one embodiment. The method 500 may be performed by the machine-learning model service instances of FIGS. 3 and 4. It may be assumed that, prior to executing method 500, an end user has created input and output streams (e.g., the input stream 410 and output stream 412). Each input and output stream may be partitioned according to the number of machine-learning model service instances (e.g., the machine-learning model service instance(s) 302 and 402 of FIGS. 3 and 4, respectively). It may also be presumed that there is a policy in place to allow the machine-learning model service instances to access the input and output streams. In some embodiments, the machine-learning model service instance(s) may be created (or updated, if already in existence) with parameters (e.g., shape, number of instances, etc.) along with a stream configuration which may include a pair of stream identifiers (e.g., an input stream identifier corresponding to input stream 410 and an output stream identifier corresponding to output stream 412). In some embodiments, the user may disable stream processing by disabling the machine-learning model service instance, deleting the instance, or removing the stream configuration from the instance.

The method 500 may begin at 502, where input data corresponding to a request for output may be obtained by a stream manager application (e.g., stream manager 308 and 408 of FIGS. 3 and 4, respectively) of a machine-learning model service instance within a cloud-computing environment (e.g., one of the machine-learning model service instance(s) 302 and/or 402 of FIGS. 3 and 4, respectively). In some embodiments, the machine-learning model service may execute the stream manager application and a machine-learning model (e.g., the model 306 or 406 of FIGS. 3 and 4, respectively) via a common cloud-computing container (e.g., a docker container (a container that is a runnable instance of a software image), a virtual machine instance, etc.). In some embodiments, the machine-learning model service may be configured to selectively process the input data using a synchronous process or an asynchronous process. Input data may be obtained by a stream manager application based at least in part on polling for the request from an input stream (e.g., the input stream 410). The stream manager application may be preconfigured (e.g., via one or more configuration parameters associated with the machine-learning model service instance/deployment) to read from the input stream.

At 504, the stream manager application may provide, via a local communication channel, the input data as input to the machine-learning model (e.g., model 306/406). In some embodiments, the local communication channel utilizes a loopback network interface that bypasses a local network interface hardware of a computing device on which the machine-learning model service executes. By way of example, the stream manager 308/408 may invoke the functionality of model 306/406 by passing the input data through a loopback network interface that causes the input data to be provided to the interface component 304/404, which in turn is configured to provide the input data to the model 306/406.

At 506, the stream manager application may receive, via the local communication channel, prediction results from the machine-learning model. As a non-limiting example, the model 306/406 may be configured to provide prediction results to the interface component 304, which in turn can provide the prediction results via the loopback network interface to the stream manager 308/408 that is configured to provide the prediction results as output data.

At 508, the prediction results may be provided (e.g., by the stream manager 308/408) as output data in response to the request (e.g., as part of the asynchronous process).

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In some cases, a cloud computing model may require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed may need to be set up first. In some instances, the provisioning can be done manually, a provisioning tool may be utilized to provision the resources, and/or deployment tools may be utilized to deploy the code once the infrastructure is provisioned.

Figure 6:
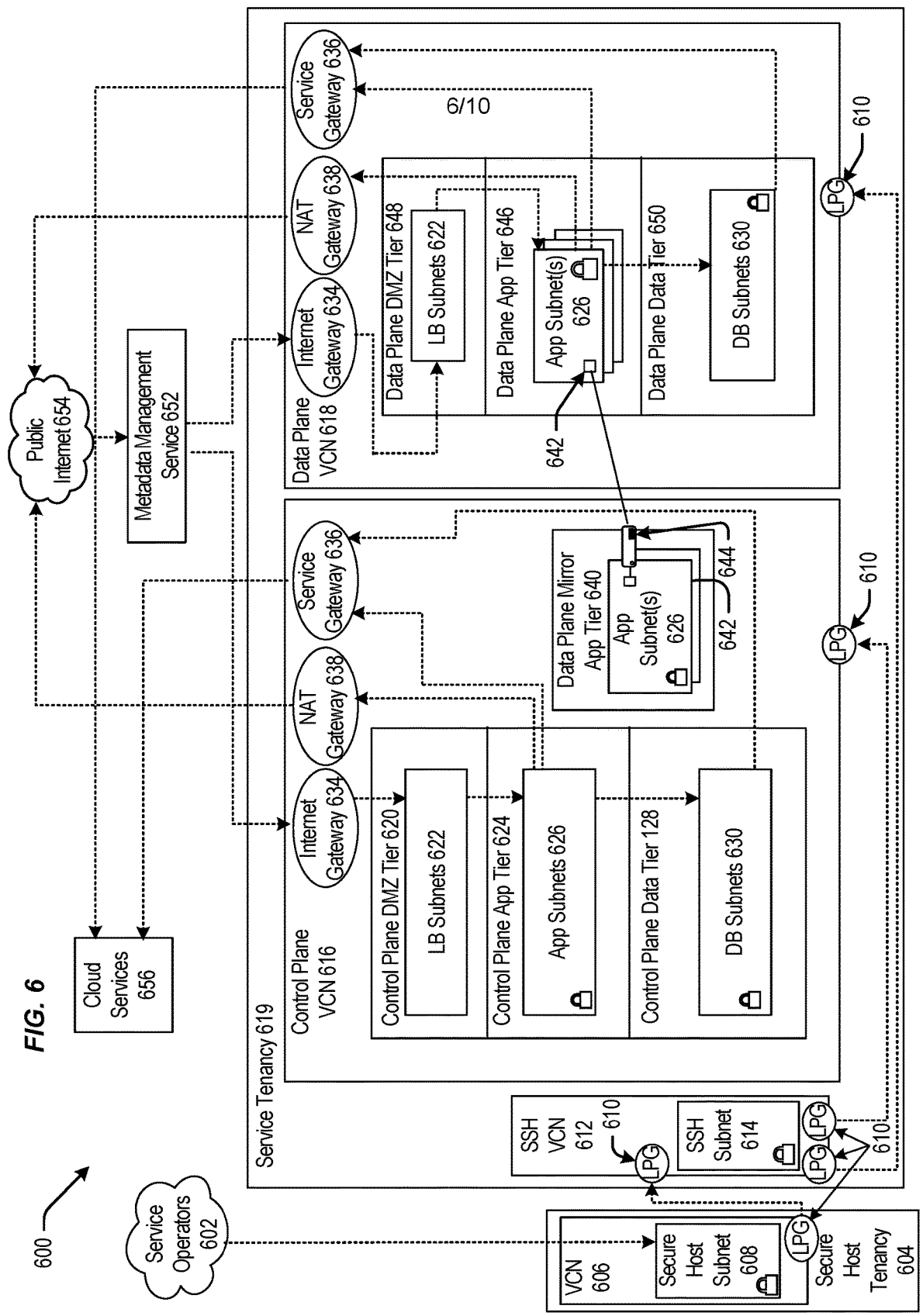
FIG. 6 is a block diagram illustrating a pattern for implementing a cloud infrastructure as a service system, according to at least one embodiment.

FIG. 6 is a block diagram 600 illustrating an example pattern of an IaaS architecture, according to at least one embodiment. Service operators 602 can be communicatively coupled to a secure host tenancy 604 that can include a virtual cloud network (VCN) 606 and a secure host subnet 608. In some examples, the service operators 602 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 606 and/or the Internet.

The VCN 606 can include a local peering gateway (LPG) 610 that can be communicatively coupled to a secure shell (SSH) VCN 612 via an LPG 610 contained in the SSH VCN 612. The SSH VCN 612 can include an SSH subnet 614, and the SSH VCN 612 can be communicatively coupled to a control plane VCN 616 via the LPG 610 contained in the control plane VCN 616. Also, the SSH VCN 612 can be communicatively coupled to a data plane VCN 618 via an LPG 610. The control plane VCN 616 and the data plane VCN 618 can be contained in a service tenancy 619 that can be owned and/or operated by the IaaS provider.

The control plane VCN 616 can include a control plane demilitarized zone (DMZ) tier 620 that acts as a perimeter network (e.g., portions of a corporate network between the corporate intranet and external networks). The DMZ-based servers may have restricted responsibilities and help keep breaches contained. Additionally, the DMZ tier 620 can include one or more load balancer (LB) subnet(s) 622, a control plane app tier 624 that can include app subnet(s) 626, a control plane data tier 628 that can include database (DB)

subnet(s) 630 (e.g., frontend DB subnet(s) and/or backend DB subnet(s)). The LB subnet(s) 622 contained in the control plane DMZ tier 620 can be communicatively coupled to the app subnet(s) 626 contained in the control plane app tier 624 and an Internet gateway 634 that can be contained in the control plane VCN 616, and the app subnet(s) 626 can be communicatively coupled to the DB subnet(s) 630 contained in the control plane data tier 628 and a service gateway 636 and a network address translation (NAT) gateway 638. The control plane VCN 616 can include the service gateway 636 and the NAT gateway 638.

The control plane VCN 616 can include a data plane mirror app tier 640 that can include app subnet(s) 626. The app subnet(s) 626 contained in the data plane mirror app tier 640 can include a virtual network interface controller (VNIC) 642 that can execute a compute instance 644. The compute instance 644 can communicatively couple the app subnet(s) 626 of the data plane mirror app tier 640 to app subnet(s) 626 that can be contained in a data plane app tier 646.

The data plane VCN 618 can include the data plane app tier 646, a data plane DMZ tier 648, and a data plane data tier 650. The data plane DMZ tier 648 can include LB subnet(s) 622 that can be communicatively coupled to the app subnet(s) 626 of the data plane app tier 646 and the Internet gateway 634 of the data plane VCN 618. The app subnet(s) 626 can be communicatively coupled to the service gateway 636 of the data plane VCN 618 and the NAT gateway 638 of the data plane VCN 618. The data plane data tier 650 can also include the DB subnet(s) 630 that can be communicatively coupled to the app subnet(s) 626 of the data plane app tier 646.

The Internet gateway 634 of the control plane VCN 616 and of the data plane VCN 618 can be communicatively coupled to a metadata management service 652 that can be communicatively coupled to public Internet 654. Public Internet 654 can be communicatively coupled to the NAT gateway 638 of the control plane VCN 616 and of the data plane VCN 618. The service gateway 636 of the control plane VCN 616 and of the data plane VCN 618 can be communicatively couple to cloud services 656.

In some examples, the service gateway 636 of the control plane VCN 616 or of the data plane VCN 618 can make application programming interface (API) calls to cloud services 656 without going through public Internet 654. The API calls to cloud services 656 from the service gateway 636 can be one-way: the service gateway 636 can make API calls to cloud services 656, and cloud services 656 can send requested data to the service gateway 636. But, cloud services 656 may not initiate API calls to the service gateway 636.

In some examples, the secure host tenancy 604 can be directly connected to the service tenancy 619, which may be otherwise isolated. The secure host subnet 608 can communicate with the SSH subnet 614 through an LPG 610 that may enable two-way communication over an otherwise isolated system. Connecting the secure host subnet 608 to the SSH subnet 614 may give the secure host subnet 608 access to other entities within the service tenancy 619.

The control plane VCN 616 may allow users of the service tenancy 619 to set up or otherwise provision desired resources. Desired resources provisioned in the control plane VCN 616 may be deployed or otherwise used in the data plane VCN 618. In some examples, the control plane VCN 616 can be isolated from the data plane VCN 618, and the data plane mirror app tier 640 of the control plane VCN 616 can communicate with the data plane app tier 646 of the data plane VCN 618 via VNICs 642 that can be contained in the data plane mirror app tier 640 and the data plane app tier 646.

In some examples, users of the system, or customers, can make requests, for example create, read, update, or delete (CRUD) operations, through public Internet 654 that can communicate the requests to the metadata management service 652. The metadata management service 652 can communicate the request to the control plane VCN 616 through the Internet gateway 634. The request can be received by the LB subnet(s) 622 contained in the control plane DMZ tier 620. The LB subnet(s) 622 may determine that the request is valid, and in response to this determination, the LB subnet(s) 622 can transmit the request to app subnet(s) 626 contained in the control plane app tier 624. If the request is validated and requires a call to public Internet 654, the call to public Internet 654 may be transmitted to the NAT gateway 638 that can make the call to public Internet 654. Memory that may be desired to be stored by the request can be stored in the DB subnet(s) 630.

In some examples, the data plane mirror app tier 640 can facilitate direct communication between the control plane VCN 616 and the data plane VCN 618. For example, changes, updates, or other suitable modifications to configuration may be desired to be applied to the resources contained in the data plane VCN 618. Via a VNIC 642, the control plane VCN 616 can directly communicate with, and can thereby execute the changes, updates, or other suitable modifications to configuration to, resources contained in the data plane VCN 618.

In some embodiments, the control plane VCN 616 and the data plane VCN 618 can be contained in the service tenancy 619. In this case, the user, or the customer, of the system may not own or operate either the control plane VCN 616 or the data plane VCN 618. Instead, the IaaS provider may own or operate the control plane VCN 616 and the data plane VCN 618, both of which may be contained in the service tenancy 619. This embodiment can enable isolation of networks that may prevent users or customers from interacting with other users', or other customers', resources. Also, this embodiment may allow users or customers of the system to store databases privately without needing to rely on public Internet 654, which may not have a desired level of threat prevention, for storage.

In other embodiments, the LB subnet(s) 622 contained in the control plane VCN 616 can be configured to receive a signal from the service gateway 636. In this embodiment, the control plane VCN 616 and the data plane VCN 618 may be configured to be called by a customer of the IaaS provider without calling public Internet 654. Customers of the IaaS provider may desire this embodiment since database(s) that the customers use may be controlled by the IaaS provider and may be stored on the service tenancy 619, which may be isolated from public Internet 654.

Figure 7:
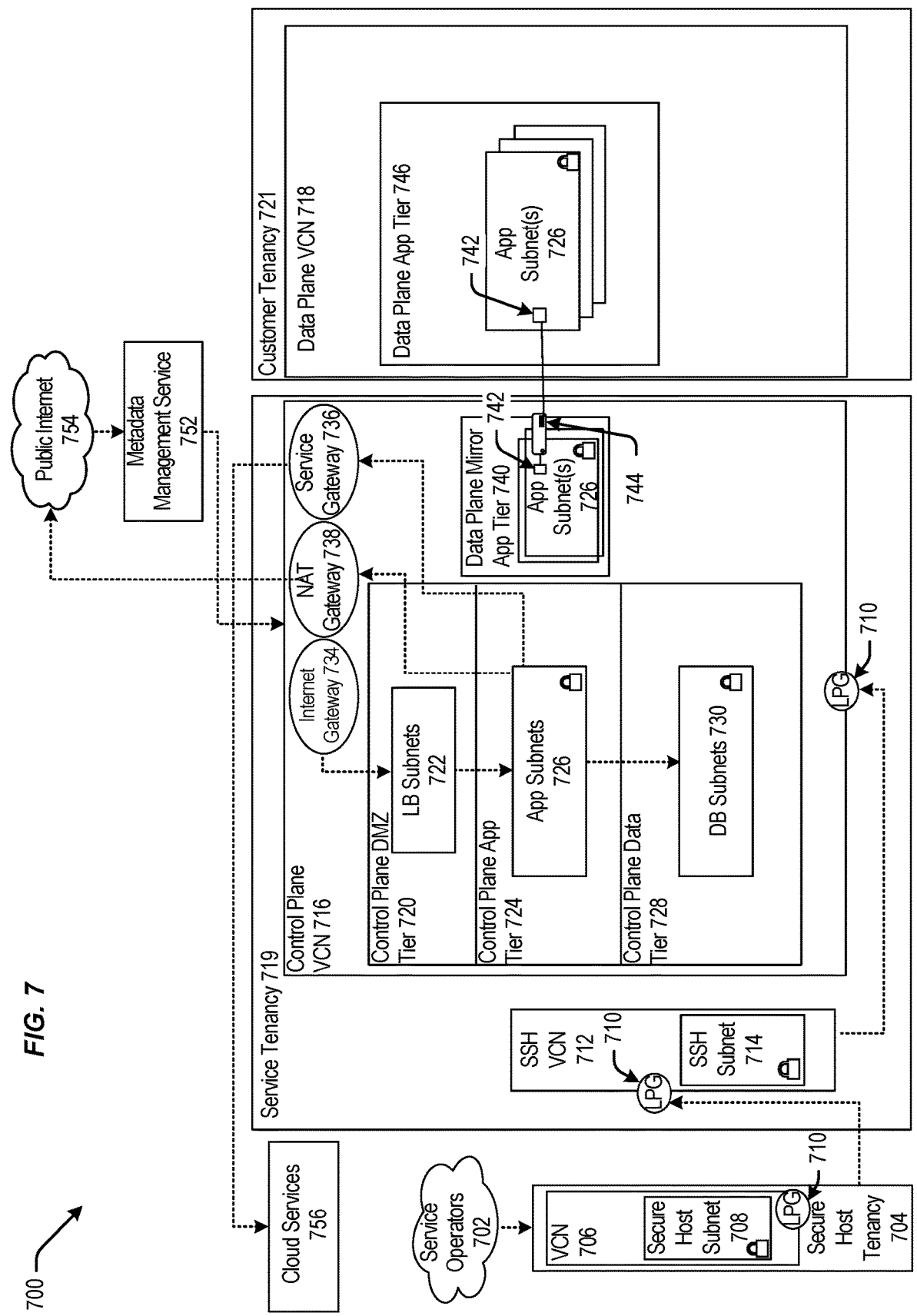
FIG. 7 is a block diagram illustrating another pattern for implementing a cloud infrastructure as a service system, according to at least one embodiment.

FIG. 7 is a block diagram 700 illustrating another example pattern of an IaaS architecture, according to at least one embodiment. Service operators 702 (e.g. service operators 602 of FIG. 6) can be communicatively coupled to a secure host tenancy 704 (e.g. the secure host tenancy 604 of FIG. 6) that can include a virtual cloud network (VCN) 706 (e.g. the VCN 606 of FIG. 6) and a secure host subnet 708 (e.g. the secure host subnet 608 of FIG. 6). The VCN 706 can include a local peering gateway (LPG) 710 (e.g. the LPG 610 of FIG. 6) that can be communicatively coupled to a secure shell (SSH) VCN 712 (e.g. the SSH VCN 612 of FIG. 6) via an LPG 610 contained in the SSH VCN 712. The SSH VCN 712 can include an SSH subnet 714 (e.g. the SSH subnet 614 of FIG. 6), and the SSH VCN 712 can be communicatively coupled to a control plane VCN 716 (e.g. the control plane VCN 616 of FIG. 6) via an LPG 710 contained in the control plane VCN 716. The control plane VCN 716 can be contained in a service tenancy 719 (e.g. the service tenancy 619 of FIG. 6), and the data plane VCN 718 (e.g. the data plane VCN 618 of FIG. 6) can be contained in a customer tenancy 721 that may be owned or operated by users, or customers, of the system.

The control plane VCN 716 can include a control plane DMZ tier 720 (e.g. the control plane DMZ tier 620 of FIG. 6) that can include LB subnet(s) 722 (e.g. LB subnet(s) 622 of FIG. 6), a control plane app tier 724 (e.g. the control plane app tier 624 of FIG. 6) that can include app subnet(s) 726 (e.g. app subnet(s) 626 of FIG. 6), a control plane data tier 728 (e.g. the control plane data tier 628 of FIG. 6) that can include database (DB) subnet(s) 730 (e.g. similar to DB subnet(s) 630 of FIG. 6). The LB subnet(s) 722 contained in the control plane DMZ tier 720 can be communicatively coupled to the app subnet(s) 726 contained in the control plane app tier 724 and an Internet gateway 734 (e.g. the Internet gateway 634 of FIG. 6) that can be contained in the control plane VCN 716, and the app subnet(s) 726 can be communicatively coupled to the DB subnet(s) 730 contained in the control plane data tier 728 and a service gateway 736 (e.g. the service gateway of FIG. 6) and a network address translation (NAT) gateway 738 (e.g. the NAT gateway 638 of FIG. 6). The control plane VCN 716 can include the service gateway 736 and the NAT gateway 738.

The control plane VCN 716 can include a data plane mirror app tier 740 (e.g. the data plane mirror app tier 640 of FIG. 6) that can include app subnet(s) 726. The app subnet(s) 726 contained in the data plane mirror app tier 740 can include a virtual network interface controller (VNIC) 742 (e.g. the VNIC of 642) that can execute a compute instance 744 (e.g. similar to the compute instance 644 of FIG. 6). The compute instance 744 can facilitate communication between the app subnet(s) 726 of the data plane mirror app tier 740 and the app subnet(s) 726 that can be contained in a data plane app tier 746 (e.g. the data plane app tier 646 of FIG. 6) via the VNIC 742 contained in the data plane mirror app tier 740 and the VNIC 742 contained in the data plane app tier 746.

The Internet gateway 734 contained in the control plane VCN 716 can be communicatively coupled to a metadata management service 752 (e.g. the metadata management service 652 of FIG. 6) that can be communicatively coupled to public Internet 754 (e.g. public Internet 654 of FIG. 6). Public Internet 754 can be communicatively coupled to the NAT gateway 738 contained in the control plane VCN 716. The service gateway 736 contained in the control plane VCN 716 can be communicatively couple to cloud services 756 (e.g. cloud services 656 of FIG. 6).

In some examples, the data plane VCN 718 can be contained in the customer tenancy 721. In this case, the IaaS provider may provide the control plane VCN 716 for each customer, and the IaaS provider may, for each customer, set up a unique compute instance 744 that is contained in the service tenancy 719. Each compute instance 744 may allow communication between the control plane VCN 716, contained in the service tenancy 719, and the data plane VCN 718 that is contained in the customer tenancy 721. The compute instance 744 may allow resources, that are provisioned in the control plane VCN 716 that is contained in the service tenancy 719, to be deployed or otherwise used in the data plane VCN 718 that is contained in the customer tenancy 721.

In other examples, the customer of the IaaS provider may have databases that live in the customer tenancy 721. In this example, the control plane VCN 716 can include the data plane mirror app tier 740 that can include app subnet(s) 726. The data plane mirror app tier 740 can reside in the data plane VCN 718, but the data plane mirror app tier 740 may not live in the data plane VCN 718. That is, the data plane mirror app tier 740 may have access to the customer tenancy 721, but the data plane mirror app tier 740 may not exist in the data plane VCN 718 or be owned or operated by the customer of the IaaS provider. The data plane mirror app tier 740 may be configured to make calls to the data plane VCN 718 but may not be configured to make calls to any entity contained in the control plane VCN 716. The customer may desire to deploy or otherwise use resources in the data plane VCN 718 that are provisioned in the control plane VCN 716, and the data plane mirror app tier 740 can facilitate the desired deployment, or other usage of resources, of the customer.

In some embodiments, the customer of the IaaS provider can apply filters to the data plane VCN 718. In this embodiment, the customer can determine what the data plane VCN 718 can access, and the customer may restrict access to public Internet 754 from the data plane VCN 718. The IaaS provider may not be able to apply filters or otherwise control access of the data plane VCN 718 to any outside networks or databases. Applying filters and controls by the customer onto the data plane VCN 718, contained in the customer tenancy 721, can help isolate the data plane VCN 718 from other customers and from public Internet 754.

In some embodiments, cloud services 756 can be called by the service gateway 736 to access services that may not exist on public Internet 754, on the control plane VCN 716, or on the data plane VCN 718. The connection between cloud services 756 and the control plane VCN 716 or the data plane VCN 718 may not be live or continuous. Cloud services 756 may exist on a different network owned or operated by the IaaS provider. Cloud services 756 may be configured to receive calls from the service gateway 736 and may be configured to not receive calls from public Internet 754. Some cloud services 756 may be isolated from other cloud services 756, and the control plane VCN 716 may be isolated from cloud services 756 that may not be in the same region as the control plane VCN 716. For example, the control plane VCN 716 may be located in "Region 1," and cloud service "Deployment 6," may be located in Region 1 and in "Region 2." If a call to Deployment 6 is made by the service gateway 736 contained in the control plane VCN 716 located in Region 1, the call may be transmitted to Deployment 6 in Region 1. In this example, the control plane VCN 716, or Deployment 6 in Region 1, may not be communicatively coupled to, or otherwise in communication with, Deployment 6 in Region 2.

Figure 8:
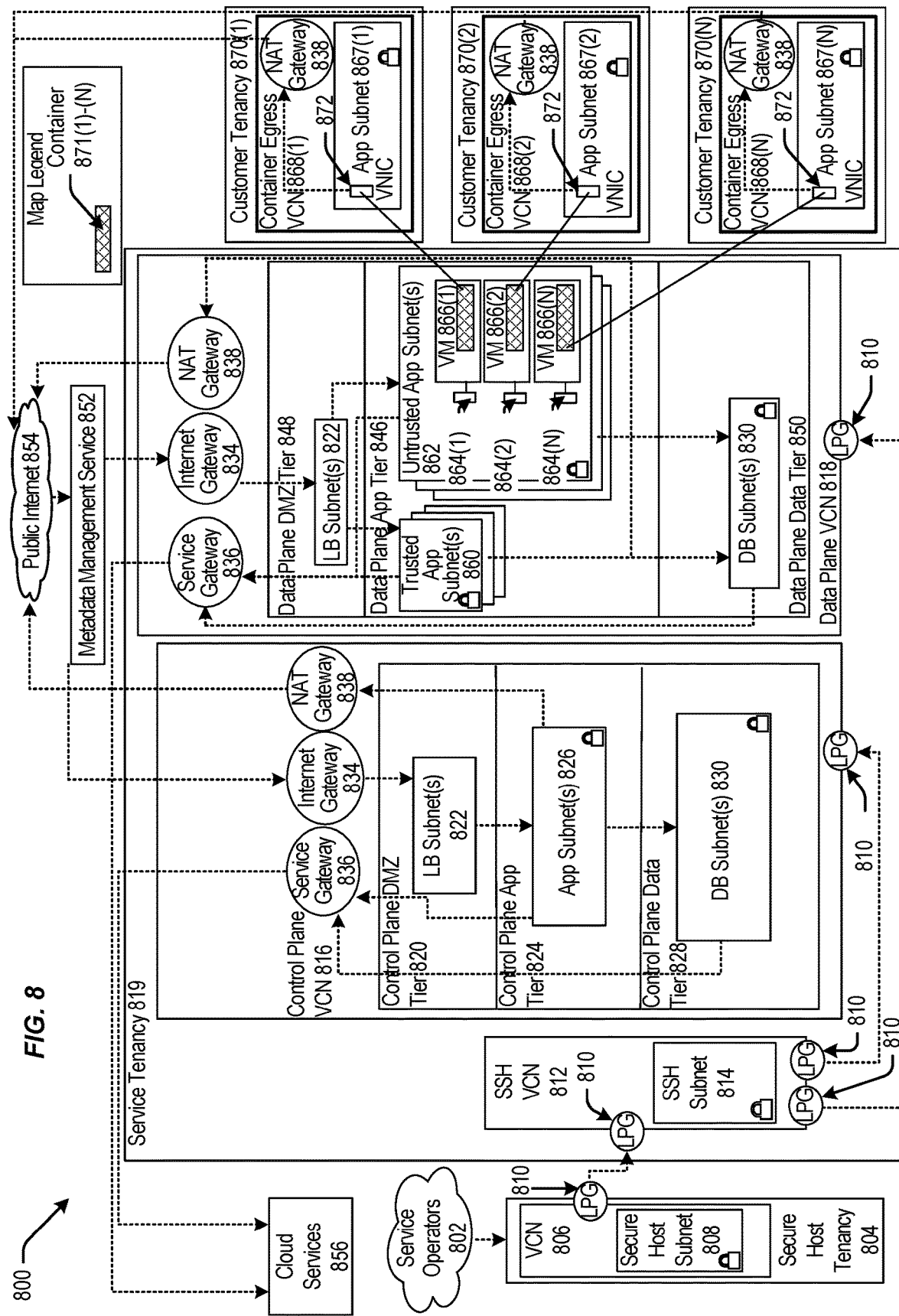
FIG. 8 is a block diagram illustrating another pattern for implementing a cloud infrastructure as a service system, according to at least one embodiment.

FIG. 8 is a block diagram 800 illustrating another example pattern of an IaaS architecture, according to at least one embodiment. Service operators 802 (e.g. service operators 602 of FIG. 6) can be communicatively coupled to a secure host tenancy 804 (e.g. the secure host tenancy 604 of FIG. 6) that can include a virtual cloud network (VCN) 806 (e.g. the VCN 606 of FIG. 6) and a secure host subnet 808 (e.g. the secure host subnet 608 of FIG. 6). The VCN 806 can include an LPG 810 (e.g. the LPG 610 of FIG. 6) that can be communicatively coupled to an SSH VCN 812 (e.g. the SSH VCN 612 of FIG. 6) via an LPG 810 contained in the SSH VCN 812. The SSH VCN 812 can include an SSH subnet 814 (e.g. the SSH subnet 614 of FIG. 6), and the SSH VCN 812 can be communicatively coupled to a control plane VCN 816 (e.g. the control plane VCN 616 of FIG. 6) via an LPG 810 contained in the control plane VCN 816 and to a data plane VCN 818 (e.g. the data plane 618 of FIG. 6) via an LPG 810 contained in the data plane VCN 818. The control plane VCN 816 and the data plane VCN 818 can be contained in a service tenancy 819 (e.g. the service tenancy 619 of FIG. 6).

The control plane VCN 816 can include a control plane DMZ tier 820 (e.g. the control plane DMZ tier 620 of FIG. 6) that can include load balancer (LB) subnet(s) 822 (e.g. LB subnet(s) 622 of FIG. 6), a control plane app tier 824 (e.g. the control plane app tier 624 of FIG. 6) that can include app subnet(s) 826 (e.g. similar to app subnet(s) 626 of FIG. 6), a control plane data tier 828 (e.g. the control plane data tier 628 of FIG. 6) that can include DB subnet(s) 830. The LB subnet(s) 822 contained in the control plane DMZ tier 820 can be communicatively coupled to the app subnet(s) 826 contained in the control plane app tier 824 and to an Internet gateway 834 (e.g. the Internet gateway 634 of FIG. 6) that can be contained in the control plane VCN 816, and the app subnet(s) 826 can be communicatively coupled to the DB subnet(s) 830 contained in the control plane data tier 828 and to a service gateway 836 (e.g. the service gateway of FIG. 6) and a network address translation (NAT) gateway 838 (e.g. the NAT gateway 638 of FIG. 6). The control plane VCN 816 can include the service gateway 836 and the NAT gateway 838.

The data plane VCN 818 can include a data plane app tier 846 (e.g. the data plane app tier 646 of FIG. 6), a data plane DMZ tier 848 (e.g. the data plane DMZ tier 648 of FIG. 6), and a data plane data tier 850 (e.g. the data plane data tier 650 of FIG. 6). The data plane DMZ tier 848 can include LB subnet(s) 822 that can be communicatively coupled to trusted app subnet(s) 860 and untrusted app subnet(s) 862 of the data plane app tier 846 and the Internet gateway 834 contained in the data plane VCN 818. The trusted app subnet(s) 860 can be communicatively coupled to the service gateway 836 contained in the data plane VCN 818, the NAT gateway 838 contained in the data plane VCN 818, and DB subnet(s) 830 contained in the data plane data tier 850. The untrusted app subnet(s) 862 can be communicatively coupled to the service gateway 836 contained in the data plane VCN 818 and DB subnet(s) 830 contained in the data plane data tier 850. The data plane data tier 850 can include DB subnet(s) 830 that can be communicatively coupled to the service gateway 836 contained in the data plane VCN 818.

The untrusted app subnet(s) 862 can include one or more primary VNICs 864(1)-(N) that can be communicatively coupled to tenant virtual machines (VMs) 866(1)-(N). Each tenant VM 866(1)-(N) can be communicatively coupled to a respective app subnet 867(1)-(N) that can be contained in respective container egress VCNs 868(1)-(N) that can be contained in respective customer tenancies 870(1)-(N). Respective secondary VNICs 872(1)-(N) can facilitate communication between the untrusted app subnet(s) 862 contained in the data plane VCN 818 and the app subnet contained in the container egress VCNs 868(1)-(N). Each container egress VCNs 868(1)-(N) can include a NAT gateway 838 that can be communicatively coupled to public Internet 854 (e.g. public Internet 654 of FIG. 6).

The Internet gateway 834 contained in the control plane VCN 816 and contained in the data plane VCN 818 can be communicatively coupled to a metadata management service 852 (e.g. the metadata management system 652 of FIG. 6) that can be communicatively coupled to public Internet 854. Public Internet 854 can be communicatively coupled to the NAT gateway 838 contained in the control plane VCN 816 and contained in the data plane VCN 818. The service gateway 836 contained in the control plane VCN 816 and contained in the data plane VCN 818 can be communicatively couple to cloud services 856.

In some embodiments, the data plane VCN 818 can be integrated with customer tenancies 870. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 846. Code to run the function may be executed in the VMs 866(1)-(N), and the code may not be configured to run anywhere else on the data plane VCN 818. Each VM 866(1)-(N) may be connected to one customer tenancy 870. Respective containers 871(1)-(N) contained in the VMs 866(1)-(N) may be configured to run the code. In this case, there can be a dual isolation (e.g., the containers 871(1)-(N) running code, where the containers 871(1)-(N) may be contained in at least the VM 866(1)-(N) that are contained in the untrusted app subnet(s) 862), which may help prevent incorrect or otherwise undesirable code from damaging the network of the IaaS provider or from damaging a network of a different customer. The containers 871(1)-(N) may be communicatively coupled to the customer tenancy 870 and may be configured to transmit or receive data from the customer tenancy 870. The containers 871(1)-(N) may not be configured to transmit or receive data from any other entity in the data plane VCN 818. Upon completion of running the code, the IaaS provider may kill or otherwise dispose of the containers 871(1)-(N).

In some embodiments, the trusted app subnet(s) 860 may run code that may be owned or operated by the IaaS provider. In this embodiment, the trusted app subnet(s) 860 may be communicatively coupled to the DB subnet(s) 830 and be configured to execute CRUD operations in the DB subnet(s) 830. The untrusted app subnet(s) 862 may be communicatively coupled to the DB subnet(s) 830, but in this embodiment, the untrusted app subnet(s) may be configured to execute read operations in the DB subnet(s) 830. The containers 871(1)-(N) that can be contained in the VM 866(1)-(N) of each customer and that may run code from the customer may not be communicatively coupled with the DB subnet(s) 830.

In other embodiments, the control plane VCN 816 and the data plane VCN 818 may not be directly communicatively coupled. In this embodiment, there may be no direct communication between the control plane VCN 816 and the data plane VCN 818. However, communication can occur indirectly through at least one method. An LPG 810 may be established by the IaaS provider that can facilitate communication between the control plane VCN 816 and the data plane VCN 818. In another example, the control plane VCN 816 or the data plane VCN 818 can make a call to cloud services 856 via the service gateway 836. For example, a call to cloud services 856 from the control plane VCN 816 can include a request for a service that can communicate with the data plane VCN 818.

Figure 9:
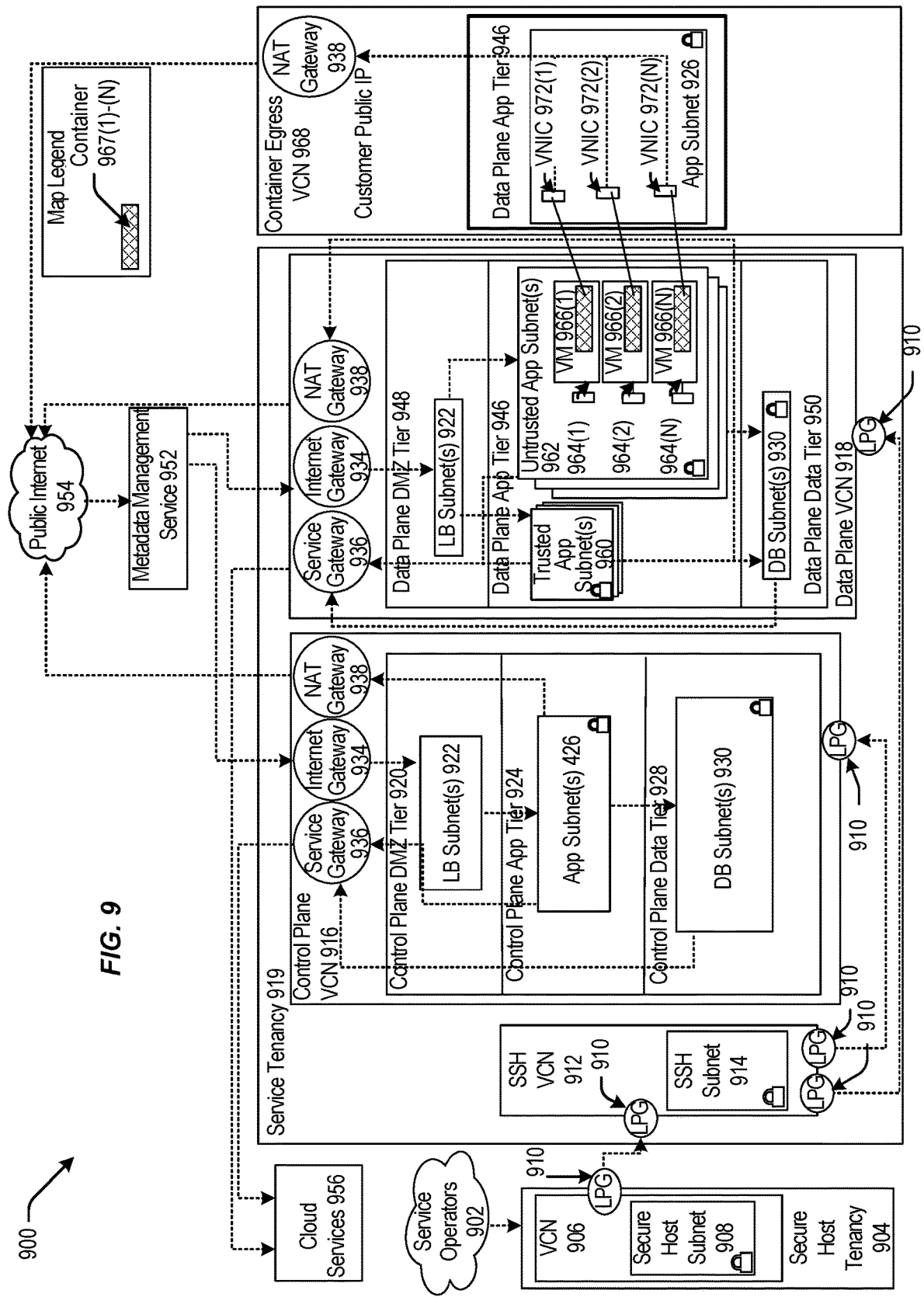
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g. service operators 602 of FIG. 6) can be communicatively coupled to a secure host tenancy 904 (e.g. the secure host tenancy 604 of FIG. 6) that can include a virtual cloud network (VCN) 906 (e.g. the VCN 606 of FIG. 6) and a secure host subnet 908 (e.g. the secure host subnet 608 of FIG. 6). The VCN 906 can include an LPG 910 (e.g. the LPG 610 of FIG. 6) that can be communicatively coupled to an SSH VCN 912 (e.g. the SSH VCN 612 of FIG. 6) via an LPG 910 contained in the SSH VCN 912. The SSH VCN 912 can include an SSH subnet 914 (e.g. the SSH subnet 614 of FIG. 6), and the SSH VCN 912 can be communicatively coupled to a control plane VCN 916 (e.g. the control plane VCN 616 of FIG. 6) via an LPG 910 contained in the control plane VCN 916 and to a data plane VCN 918 (e.g. the data plane 618 of FIG. 6) via an LPG 910 contained in the data plane VCN 918. The control plane VCN 916 and the data plane VCN 918 can be contained in a service tenancy 919 (e.g. the service tenancy 619 of FIG. 6).

The control plane VCN 916 can include a control plane DMZ tier 920 (e.g. the control plane DMZ tier 620 of FIG. 6) that can include LB subnet(s) 922 (e.g. LB subnet(s) 622 of FIG. 6), a control plane app tier 924 (e.g. the control plane app tier 624 of FIG. 6) that can include app subnet(s) 926 (e.g. app subnet(s) 626 of FIG. 6), a control plane data tier 928 (e.g. the control plane data tier 628 of FIG. 6) that can include DB subnet(s) 930 (e.g. DB subnet(s) 830 of FIG. 8). The LB subnet(s) 922 contained in the control plane DMZ tier 920 can be communicatively coupled to the app subnet(s) 926 contained in the control plane app tier 924 and to an Internet gateway 934 (e.g. the Internet gateway 634 of FIG. 6) that can be contained in the control plane VCN 916, and the app subnet(s) 926 can be communicatively coupled to the DB subnet(s) 930 contained in the control plane data tier 928 and to a service gateway 936 (e.g. the service gateway of FIG. 6) and a network address translation (NAT) gateway 938 (e.g. the NAT gateway 638 of FIG. 6). The control plane VCN 916 can include the service gateway 936 and the NAT gateway 938.

The data plane VCN 918 can include a data plane app tier 946 (e.g. the data plane app tier 646 of FIG. 6), a data plane DMZ tier 948 (e.g. the data plane DMZ tier 648 of FIG. 6), and a data plane data tier 950 (e.g. the data plane data tier 650 of FIG. 6). The data plane DMZ tier 948 can include LB subnet(s) 922 that can be communicatively coupled to trusted app subnet(s) 960 (e.g. trusted app subnet(s) 860 of FIG. 8) and untrusted app subnet(s) 962 (e.g. untrusted app subnet(s) 862 of FIG. 8) of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include primary VNICs 964(1)-(N) that can be communicatively coupled to tenant virtual machines (VMs) 966(1)-(N) residing within the untrusted app subnet(s) 962. Each tenant VM 966(1)-(N) can run code in a respective container 967(1)-(N), and be communicatively coupled to an app subnet 926 that can be contained in a data plane app tier 946 that can be contained in a container egress VCN 968. Respective secondary VNICs 972(1)-(N) can facilitate communication between the untrusted app subnet(s) 962 contained in the data plane VCN 918 and the app subnet contained in the container egress VCN 968. The container egress VCN can include a NAT gateway 938 that can be communicatively coupled to public Internet 954 (e.g. public Internet 654 of FIG. 6).

The Internet gateway 934 contained in the control plane VCN 916 and contained in the data plane VCN 918 can be communicatively coupled to a metadata management service 952 (e.g. the metadata management system 652 of FIG. 6) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively couple to cloud services 956.

In some examples, the pattern illustrated by the architecture of block diagram 900 of FIG. 9 may be considered an exception to the pattern illustrated by the architecture of block diagram 800 of FIG. 8 and may be desirable for a customer of the IaaS provider if the IaaS provider cannot directly communicate with the customer (e.g., a disconnected region). The respective containers 967(1)-(N) that are contained in the VMs 966(1)-(N) for each customer can be accessed in real-time by the customer. The containers 967(1)-(N) may be configured to make calls to respective secondary VNICs 972(1)-(N) contained in app subnet(s) 926 of the data plane app tier 946 that can be contained in the container egress VCN 968. The secondary VNICs 972(1)-(N) can transmit the calls to the NAT gateway 938 that may transmit the calls to public Internet 954. In this example, the containers 967(1)-(N) that can be accessed in real-time by the customer can be isolated from the control plane VCN 916 and can be isolated from other entities contained in the data plane VCN 918. The containers 967(1)-(N) may also be isolated from resources from other customers.

In other examples, the customer can use the containers 967(1)-(N) to call cloud services 956. In this example, the customer may run code in the containers 967(1)-(N) that requests a service from cloud services 956. The containers 967(1)-(N) can transmit this request to the secondary VNICs 972(1)-(N) that can transmit the request to the NAT gateway that can transmit the request to public Internet 954. Public Internet 954 can transmit the request to LB subnet(s) 922 contained in the control plane VCN 916 via the Internet gateway 934. In response to determining the request is valid, the LB subnet(s) can transmit the request to app subnet(s) 926 that can transmit the request to cloud services 956 via the service gateway 936.

It should be appreciated that IaaS architectures 600, 700, 800, 900 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 10:
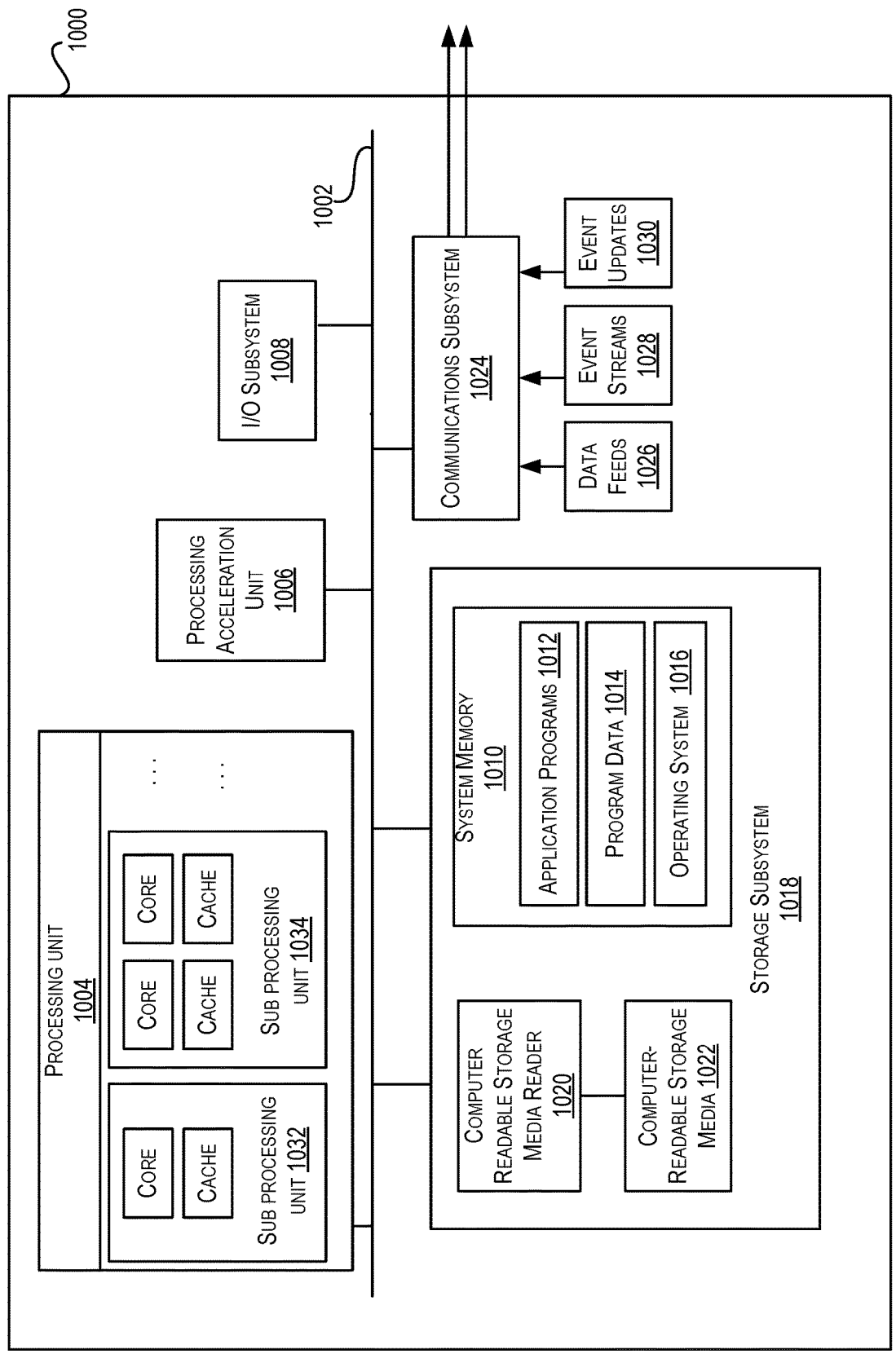
FIG. 10 is a block diagram illustrating an example computer system, according to at least one embodiment.

FIG. 10 illustrates an example computer system 1000, in which various embodiments may be implemented. The system 1000 may be used to implement any of the computer systems described above. As shown in the figure, computer system 1000 includes a processing unit 1004 that communicates with a number of peripheral subsystems via a bus subsystem 1002. These peripheral subsystems may include a processing acceleration unit 1006, an I/O subsystem 1008, a storage subsystem 1018 and a communications subsystem 1024. Storage subsystem 1018 includes tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1004, which can be implemented as one or more integrated circuits (e.g., a conventional microprocessor or microcontroller), controls the operation of computer system 1000. One or more processors may be included in processing unit 1004. These processors may include single core or multicore processors. In certain embodiments, processing unit 1004 may be implemented as one or more independent processing units 1032 and/or 1034 with single or multicore processors included in each processing unit. In other embodiments, processing unit 1004 may also be implemented as a quad-core processing unit formed by integrating two dual-core processors into a single chip.

In various embodiments, processing unit 1004 can execute a variety of programs in response to program code and can maintain multiple concurrently executing programs or processes. At any given time, some or all of the program code to be executed can be resident in processor(s) 1004 and/or in storage subsystem 1018. Through suitable programming, processor(s) 1004 can provide various functionalities described above. Computer system 1000 may additionally include a processing acceleration unit 1006, which can include a digital signal processor (DSP), a special-purpose processor, and/or the like.

I/O subsystem 1008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1000 may comprise a storage subsystem 1018 that comprises software elements, shown as being currently located within a system memory 1010. System memory 1010 may store program instructions that are loadable and executable on processing unit 1004, as well as data generated during the execution of these programs.

Depending on the configuration and type of computer system 1000, system memory 1010 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1004. In some implementations, system memory 1010 may include multiple different types of memory, such as static random access memory (SRAM) or dynamic random access memory (DRAM). In some implementations, a basic input/output system (BIOS), containing the basic routines that help to transfer information between elements within computer system 1000, such as during start-up, may typically be stored in the ROM. By way of example, and not limitation, system memory 1010 also illustrates application programs 1012, which may include client applications, Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1018 may also provide a tangible computer-readable storage medium for storing the basic programming and data constructs that provide the functionality of some embodiments. Software (programs, code modules, instructions) that when executed by a processor provide the functionality described above may be stored in storage subsystem 1018. These software modules or instructions may be executed by processing unit 1004. Storage subsystem 1018 may also provide a repository for storing data used in accordance with the present disclosure.

Storage subsystem 1000 may also include a computer-readable storage media reader 1020 that can further be connected to computer-readable storage media 1022. Together and, optionally, in combination with system memory 1010, computer-readable storage media 1022 may comprehensively represent remote, local, fixed, and/or removable storage devices plus storage media for temporarily and/or more permanently containing, storing, transmitting, and retrieving computer-readable information.

Computer-readable storage media 1022 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1000.

By way of example, computer-readable storage media 1022 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1000.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to connect to one or more devices via the Internet. In some embodiments communications subsystem 1024 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

In some embodiments, communications subsystem 1024 may also receive input communication in the form of structured and/or unstructured data feeds 1026, event streams 1028, event updates 1030, and the like on behalf of one or more users who may use computer system 1000.

By way of example, communications subsystem 1024 may be configured to receive data feeds 1026 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1024 may also be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method, comprising:
obtaining, by a machine-learning model service within a cloud-computing environment, input data corresponding to a request for output, the machine-learning model service executing a stream manager application and a machine-learning model via a common cloud-computing container, the machine-learning model service being configured to selectively process provided input data using a synchronous process or an asynchronous process;
providing, by the stream manager application via a local communication channel as part of the asynchronous process, the input data as input to the machine-learning model, wherein the local communication channel bypasses a local network interface hardware of a computing device on which the machine-learning model service executes;
receiving, by the stream manager application via the local communication channel, prediction results from the machine-learning model; and
providing, as part of the asynchronous process, the prediction results as output data in response to the request.

2. The computer-implemented method of claim 1, wherein the stream manager application is configured to read the input data from i) an input data stream or a partitioned input data stream of a plurality of partitioned input data streams managed by a cloud streaming service.

3. The computer-implemented method of claim 1, wherein the output data is provided to i) an output data stream or ii) a partitioned output data stream of a plurality of partitioned output data streams.

4. The computer-implemented method of claim 1, where the machine-learning model service is one instance of a plurality of instances of the machine-learning model service within the cloud-computing environment, and wherein each instance of the plurality of instances of the machine-learning model service executes a separate stream manager application and a separate machine-learning model.

5. The computer-implemented method of claim 1, wherein the machine-learning model service executes a web interface with which functionality of the machine-learning model is invoked.

6. The computer-implemented method of claim 5, wherein providing the input data as input to the machine-learning model utilizes the web interface.

7. The computer-implemented method of claim 6, further comprising receiving the request from a client device, wherein the request comprises a first identifier for an input data stream from which the input data is obtained and a second identifier that identifies an output data stream, and wherein obtaining the input data, providing the input data as input to the machine-learning model, receiving the output data, and providing the prediction results as the output data are performed subsequent to identifying that the request comprises the first identifier and the second identifier.

8. A computing device executing a machine-learning model service within a cloud-computing environment, the computing device comprising:
one or more processors; and
one or more memories storing computer-executable instructions that, when executed with the one or more processors, cause the one or more processors to:
obtain, by the machine-learning model service, input data corresponding to a request for output, the machine-learning model service executing a stream manager application and a machine-learning model via a common cloud-computing container, the machine-learning model service being configured to selectively process provided input data using a synchronous process or an asynchronous process;
provide, by the stream manager application via a local communication channel as part of the asynchronous process, the input data as input to the machine-learning model, wherein the local communication channel bypasses a local network interface hardware of the computing device on which the machine-learning model service executes;
receive, by the stream manager application via the local communication channel, predictions results from the machine-learning model; and
provide, as part of the asynchronous process, the prediction results as output data in response to the request.

9. The computing device of claim 8, wherein the stream manager application is configured to read the input data from i) an input data stream or ii) a partitioned input data stream of a plurality of partitioned input data streams managed by a cloud streaming service.

10. The computing device of claim 8, wherein the output data is provided to i) an output data stream or ii) a partitioned output data stream of a plurality of partitioned output data streams.

11. The computing device of claim 8, where the machine-learning model service is one instance of a plurality of instances of the machine-learning model service within the cloud-computing environment, and wherein each instance of the plurality of instances of the machine-learning model service executes a separate stream manager application and a separate machine-learning model.

12. The computing device of claim 8, wherein the machine-learning model service executes a web interface with which functionality of the machine-learning model is invoked.

13. The computing device of claim 12, wherein providing the input data as input to the machine-learning model utilizes the web interface.

14. The computing device of claim 13, wherein executing the computer-executable instructions further causes the one or more processors to receive the request from a client device, wherein the request comprises a first identifier for an input data stream from which the input data is obtained and a second identifier that identifies an output data stream, and wherein obtaining the input data, providing the input data as input to the machine-learning model, receiving the output data, and providing the prediction results as the output data are performed subsequent to identifying that the request comprises the first identifier and the second identifier.

15. A non-transitory computer-readable storage medium comprising executable instructions that, when executed with one or more processors of a computing device executing a machine-learning model service within a cloud-computing environment, cause the computing device to:
obtain, by the machine-learning model service, input data corresponding to a request for output, the machine-learning model service executing a stream manager application and a machine-learning model via a common cloud-computing container, the machine-learning model service being configured to selectively process provided input data using a synchronous process or an asynchronous process;
provide, by the stream manager application via a local communication channel as part of the asynchronous process, the input data as input to the machine-learning model, wherein the local communication channel bypasses a local network interface hardware of the computing device on which the machine-learning model service executes;
receive, by the stream manager application via the local communication channel, predictions results from the machine-learning model; and
provide, as part of the asynchronous process, the prediction results as output data in response to the request.

16. The non-transitory computer-readable storage medium of claim 15, wherein the stream manager application is configured to read the input data from i) an input data stream or a partitioned input data stream of a plurality of partitioned input data streams managed by a cloud streaming service.

17. The non-transitory computer-readable storage medium of claim 15, wherein the output data is provided to i) an output data stream or a partitioned output data stream of a plurality of partitioned output data streams managed by a cloud streaming service.

18. The non-transitory computer-readable storage medium of claim 15, wherein the machine-learning model service executes a web interface with which functionality of the machine-learning model is invoked.

19. The non-transitory computer-readable storage medium of claim 18, wherein providing the input data as input to the machine-learning model utilizes the web interface.

20. The non-transitory computer-readable storage medium of claim 15, wherein executing the executable instructions further causes the computing device to receive the request from a client device, wherein the request comprises a first identifier for an input data stream from which the input data is obtained and a second identifier that identifies an output data stream, and wherein obtaining the input data, providing the input data as input to the machine-learning model, receiving the output data, and providing the prediction results as the output data are performed subsequent to identifying that the request comprises the first identifier and the second identifier.

* * * * *

UNITED STATES PATENT AND TRADEMARK OFFICE
CERTIFICATE OF CORRECTION

PATENT NO. : 12,353,420 B2
APPLICATION NO. : 17/387795
DATED : July 8, 2025
INVENTOR(S) : Phillippe et al.

Page 1 of 1

It is certified that error appears in the above-identified patent and that said Letters Patent is hereby corrected as shown below:

In the Claims

In Column 26, Line 54, in Claim 2, after "or" insert -- ii) --, therefor.

In Column 28, Line 43, in Claim 16, after "or" insert -- ii) --, therefor.

In Column 28, Line 48, in Claim 17, after "or" insert -- ii) --, therefor.

Signed and Sealed this
Twenty-first Day of October, 2025

John A. Squires
*Director of the United States Patent and Trademark Office*